2,819,307
PREPARATION OF N-TERT-BUTYL FORMAMIDE

Harry E. Albert, Akron, Ohio, assignor to The Firestone Tire & Rubber Company, Akron, Ohio, a corporation of Ohio No Drawing. Application September 14, 1953
Serial No. 380,088

3 Claims. (Cl. 260—561)

This invention relates to an improved method of preparing N-tert-butyl formamide by reacting isobutylene with hydrocyanic acid.

It has previously been proposed to react various olefins with hydrogen cyanide in the presence of an equimolecular proportion of substantially anhydrous sulfuric acid or other cationoid substance. However, it has been found that when this reaction is applied to isobutylene, low yields of less than 50% of the desired formamide are produced. Accordingly, it is an object of the invention to provide an improved method of producing N-tert-butylformamide by reacting hydrogen cyanide with isobutylene, a tertiary olefin, to produce the desired product in high yields and in substantially pure form. Other objects of the invention will be apparent in the description of the invention which follows.

Unexpectedly, it has been found that yields of the desired formamide are tremendously improved by reacting isobutylene with hydrogen cyanide in the presence of aqueous sulfuric acid containing substantially 13 to 18% water rather than in the presence of anhydrous sulfuric acid or the substantially anhydrous 96% sulfuric acid of commerce. Furthermore it has been found that more than the usual equimolecular proportion of sulfuric acid is desirable in order to produce high yields. At least 1.5 moles, and preferably substantially 2 moles, of sulfuric acid should be present for each mole of the olefin in order to produce maximum yields of the formamide, based upon the olefin used. Also it has been found that slightly more than one mole of hydrogen cyanide per mole of the olefin improves the yields of the formamide.

The reactions involved in the present invention are believed to be in accordance with the following equations:

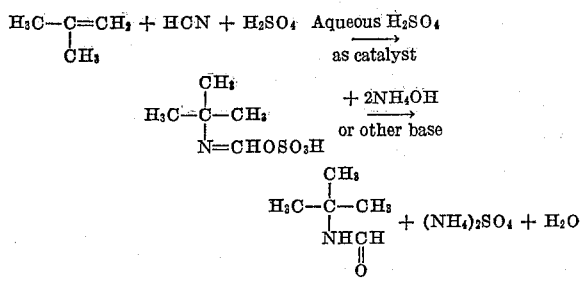

Preferred conditions for carrying out the reaction of the invention are, as indicated above, to utilize one mole of the isobutylene, one mole or slightly more than one mole of hydrogen cyanide and at least about 1.5 moles of aqueous sulfuric acid containing substantially 13–18% water. The indicated overall excess of hydrogen cyanide need not be more than about 0.30 mole, that is, up to 30% excess. More than this amount of hydrogen cyanide is not advantageous, but the use of no excess hydrogen cyanide results in lower yields of the desired formamide. A preferred procedure involves simultaneously and gradually adding (1) a mole of isobutylene and (2) at least one mole of hydrogen cyanide to the diluted sulfuric acid, the hydrogen cyanide addition being kept ahead (on a molar basis) of the addition of the olefin.

At the conclusion of the addition of hydrogen cyanide and olefin to the mixture and the completion of the reaction of hydrogen cyanide with the olefin, the desired formamide is produced by reacting the mixture with an alkaline material, such as sodium hydroxide, aqueous sodium carbonate, ammonium hydroxide or other basic material. A preferred feature of the invention involves neutralizing the reaction mixture with aqueous ammonia, separating the ammonium sulfate solution from the organic liquid and subsequently recovering ammonium sulfate from the solution. An organic solvent, such as benzene, toluene, gasoline, petroleum ether or hexane, can be introduced into the reaction mixture either during the reaction or during the resulting neutralization step (or can be omitted).

An alternative mixing procedure within the scope of the invention involves initially mixing the hydrogen cyanide and the diluted sulfuric acid, and then gradually adding the olefin to this mixture. The reaction is successfully carried out at atmospheric pressure, although it is advantageous to introduce isobutylene to the reaction mixture under superatmospheric pressure.

Various methods of carrying out the invention are illustrated in the following examples.

EXAMPLE 1

N-tert-butylformamide

A 500 ml. 3-neck flask was provided with a gas inlet tube, a sealed stirrer and a Y connection leading to a reflux condenser and an addition funnel having a small reflux condenser, both condensers being supplied with water chilled to 10° C. One mole of 87% sulfuric acid was placed in the flask, this acid concentration having been obtained by mixing 102 grams of 96% sulfuric acid with 10.5 grams of water. Twenty-two ml. (0.57 mole) of liquid hydrogen cyanide was placed in the small addition funnel. The 500 ml. flask was immersed in an ice bath and one-quarter of the hydrogen cyanide was added. While the temperature was maintained at 20–25° C., isobutylene was passed through the gas inlet tube into the flask. The hydrogen cyanide was added in a half hour period and 28 grams (0.5 mole) of isobutylene was absorbed in the reaction mixture in 60 minutes. The reaction mixture was heated to 60–65° C. and then allowed to stand overnight. It was poured over ice, neutralized with concentrated ammonia and extracted four times with ether. The ether solution was dried over anhydrous sodium carbonate and, after removal of the ether, the residue was vacuum-distilled. The product was taken at 95–105° C. at 18 mm. and weighed 47.5 grams (94% of theory).

EXAMPLE 2

N-tert-butylformamide

The apparatus and procedure of Example 1 was utilized except that one mole of 85% acid was employed (102 grams of 96% sulfuric acid plus 13 grams of water), a yield of 47.0 grams (93%) of the desired product was obtained.

EXAMPLE 3

N-tert-butylformamide

Example 1 was repeated (quantities were doubled), except that after being heated to 60–65° C., the reaction mixture was allowed to cool one hour and then worked up as described. The yield of desired product was 94.9 grams (94%).

EXAMPLE 4

N-tert-butylformamide

Dilution of 204 grams of 96% sulfuric acid with 35.2 grams of water gave 2 moles of 82% acid. To this solution about one quarter of 44 ml. (1.14 moles) of liquid hydrogen cyanide was added at 20–25° C. to the equipment of Example 1, and then the addition of isobutylene was started. At this temperature, the remainder of the hydrogen cyanide was added over 40 minutes, and the isobutylene (56 grams=1 mole) was added over a 1½ hour period. The reaction mixture was heated to 60–65° C., then allowed to stand overnight. After neutralization with ammonia, extraction with ether, drying over anhydrous sodium carbonate, and distillation, the product was obtained in a yield of 93.8 grams (92.9%).

EXAMPLE 5

N-tert-butylformamide

Example 2 was repeated (double quantities were employed), except that the simultaneous addition technique was not used, all the hydrogen cyanide being added to the 85% sulfuric acid before isobutylene addition was started. The yield of the formamide was 86.0 grams (85.2%).

EXAMPLE 6

N-tert-butylformamide

Example 2 was repeated (double quantities were used), except that a larger excess (29%) of hydrogen cyanide was employed. The yield of desired product was 95.0 grams (94.0%).

EXAMPLE 7

N-tert-butylformamide

Again the equipment of Example 1 was employed. Dilution of 255 grams of 96% sulfuric acid with 32.5 grams of water gave 2.5 moles of 85% acid. At 20–25° C. about one quarter of 50 ml. (1.29 moles) of liquid hydrogen cyanide was added. Isobutylene addition was started. The hydrogen cyanide was added in ½ hour, and 57 grams (1.02 moles) of isobutylene was added in one hour. The reaction mixture was heated to 65° C. and then allowed to cool to room temperature during stirring. The cooled mixture was poured over ice, neutralized with ammonia, and the product was extracted with ether. The ether solution was dried over anhydrous sodium carbonate and, after ether removal, the residue was vacuum-distilled. The product, taken at 96–106° C. at 19 mm. weighed 97.9 grams (95% of theory based on isobutylene).

EXAMPLE 8

N-tert-butylformamide

Dilution of 153 grams (1.5 moles) of 96% sulfuric acid with 19.5 grams of water gave 1.5 moles of 85% acid. The apparatus of Example 1 was utilized. At 20–25° C. about one quarter of 44 ml. (1.14 moles) of hydrogen cyanide was added and then isobutylene addition was started. The hydrogen cyanide was added in ¾ hour. The isobutylene, 55.5 grams (0.99 mole) was added in 1¾ hour, the reaction temperature being gradually raised to 60–65° C. during the latter hour of this period. The reaction mixture was allowed to stand overnight, and then it was worked up as described previously. The yield was 90.3 grams (89.4%).

What is claimed is:

1. Method of producing N-tert-butylformamide which essentially consists in reacting one mole of isobutylene with slightly more than one mole of hydrogen cyanide in the presence of 1.5 to 2.5 moles of aqueous sulfuric acid containing substantially 13 to 18% water, the isobutylene being gradually added to the sulfuric acid containing hydrogen cyanide at a temperature of approximately 20 to 25° C., thereafter heating the reaction mixture to approximately 60° C., neutralizing the resulting acidic reaction product with ammonia, and separating the resulting formamide from the aqueous liquid containing dissolved ammonium sulfate.

2. Method of producing N-tert-butylformamide which essentially consists in reacting substantially one mole of isobutylene with one mole of hydrocyanic acid in the presence of 1.5 to 2.5 moles of aqueous sulfuric acid containing substantially 13 to 18% water, the isobutylene being gradually added to the sulfuric acid containing hydrogen cyanide at a temperature of approximately 20 to 25° C., thereafter heating the reaction mixture to approximately 60° C., and then neutralizing the resulting acidic reaction product.

3. Improved method of producing high yields of N-tert-butylformamide which essentially consists in simultaneously gradually adding one mole of isobutylene and at least one mole of hydrogen cyanide to 1.5 to 2.5 moles of aqueous sulfuric acid, the acid containing substantially 13 to 18% water, the hydrogen cyanide addition being kept ahead (on a molar basis) of the addition of the olefin, the temperature of the mixture being maintained at approximately 20 to 25° C. during addition of the olefin, thereafter heating the reaction mixture to approximately 60° C., and then neutralizing the resulting acidic reaction product.

References Cited in the file of this patent

UNITED STATES PATENTS

| Number | Name | Date |
|---|---|---|
| 2,457,660 | Gresham et al. | Dec. 28, 1949 |
| 2,573,673 | Ritter | Oct. 30, 1951 |
| 2,620,327 | Albisetti | Dec. 2, 1952 |
| 2,626,959 | Chenicek | Jan. 27, 1953 |
| 2,632,022 | Bortnick | Mar. 17, 1953 |
| 2,632,023 | Bortnick | Mar. 17, 1953 |
| 2,653,975 | Mowry et al. | Sept. 29, 1953 |

OTHER REFERENCES

Ritter et al.: "J. Am. Chem. Soc.," vol. 70 (1948), pp. 4045–50.